United States Patent
Dawkins et al.

(10) Patent No.: US 9,558,494 B2
(45) Date of Patent: Jan. 31, 2017

(54) DEVICES, SYSTEMS, AND METHODS FOR TOKENIZING SENSITIVE INFORMATION

(75) Inventors: Jerald Dawkins, Tulsa, OK (US); Alex Pezold, Tulsa, OK (US)

(73) Assignee: TokenEx, L.L.C., Tulsa, OK (US)

( * ) Notice: Subject to any disclaimer, the term of this patent is extended or adjusted under 35 U.S.C. 154(b) by 501 days.

(21) Appl. No.: 13/085,843

(22) Filed: Apr. 13, 2011

(65) Prior Publication Data

US 2011/0258123 A1  Oct. 20, 2011

Related U.S. Application Data

(60) Provisional application No. 61/282,899, filed on Apr. 19, 2010.

(51) Int. Cl.
*G06Q 20/00* (2012.01)
*G06Q 20/38* (2012.01)
*G06Q 20/10* (2012.01)
*G06Q 20/20* (2012.01)
*G06Q 20/40* (2012.01)

(52) U.S. Cl.
CPC ........... *G06Q 20/385* (2013.01); *G06Q 20/10* (2013.01); *G06Q 20/20* (2013.01); *G06Q 20/204* (2013.01); *G06Q 20/382* (2013.01); *G06Q 20/40* (2013.01); *G06Q 20/401* (2013.01)

(58) Field of Classification Search
USPC .... 705/75, 16, 21, 59, 71; 380/44, 262, 278, 380/279
See application file for complete search history.

(56) References Cited

U.S. PATENT DOCUMENTS

| | | | |
|---|---|---|---|
| 4,683,536 A * | 7/1987 | Yamamoto | 705/17 |
| 7,770,789 B2 | 8/2010 | Oder, II et al. | |
| 7,841,532 B2 | 11/2010 | Longacre, Jr. et al. | |
| 2004/0073688 A1* | 4/2004 | Sampson | G06F 17/30067 709/229 |
| 2006/0167819 A1 | 7/2006 | Bhambri et al. | |
| 2007/0192245 A1 | 8/2007 | Fisher et al. | |
| 2008/0215841 A1* | 9/2008 | Bolotin | G06F 1/1632 711/164 |
| 2008/0257956 A1* | 10/2008 | Grannan | G06Q 30/06 235/380 |
| 2008/0263645 A1 | 10/2008 | Renter et al. | |
| 2009/0171847 A2* | 7/2009 | Bhambri | G06Q 30/06 705/59 |
| 2009/0249082 A1 | 10/2009 | Mattsson | |
| 2009/0294527 A1 | 12/2009 | Brabson et al. | |
| 2010/0257612 A1 | 10/2010 | McGuire et al. | |
| 2010/0318468 A1 | 12/2010 | Carr et al. | |
| 2011/0023103 A1* | 1/2011 | Dietrich | G06F 21/31 726/9 |

OTHER PUBLICATIONS

PCT International Preliminary Report on Patentability.

* cited by examiner

*Primary Examiner* — Dante Ravetti
(74) *Attorney, Agent, or Firm* — John M. Behles (57) ABSTRACT

Devices, systems, and methods for tokenizing sensitive information are provided herein. Methods may include the steps of receiving sensitive information via an input device, the input device being communicatively coupled to a transaction terminal, tokenizing the sensitive information at the input device to generate a token, and associating the token and the sensitive information together in a storage medium associated with the input device.

9 Claims, 7 Drawing Sheets

DEVICES, SYSTEMS, AND METHODS FOR TOKENIZING SENSITIVE INFORMATION

CROSS-REFERENCE TO RELATED APPLICATIONS

This non-provisional patent application claims the benefit of U.S. Provisional Application Ser. No. 61/282,899, filed on Apr. 19, 2010, entitled "Data Security—Credit Card Extraction to Support Tokenization and E2E Process"—all of which is hereby incorporated by reference herein in its entirety including all references cited therein.

FIELD OF INVENTION

The present invention relates generally to the tokenization of sensitive information, and more particularly, but not by way of limitation, to devices, systems and methods for tokenizing sensitive information.

SUMMARY OF THE INVENTION

Provided herein are exemplary devices, systems and methods for tokenizing sensitive information. Exemplary embodiments may include methods for tokenizing sensitive data by: (a) receiving sensitive information via an input device, the input device being communicatively coupled to a transaction terminal; (b) tokenizing the sensitive information at the input device to generate a token; and (c) associating the token and the sensitive information together in a storage medium associated with the input device.

Additional exemplary embodiments may include methods for tokenizing sensitive data that include: (a) receiving a token from a tap device disposed between a sensitive information source and a transaction terminal, the token including sensitive information that has been tokenized by the tap device, the tap device being operatively connected to the sensitive information source; and (b) associating the token and the sensitive information together in a storage medium associated with the tap device.

In other exemplary embodiments, systems for tokenizing sensitive information that may include: (a) a tap device configured to be disposed between a sensitive information source and a transaction terminal, the tap device including a tokenization module configured to receive sensitive information from the sensitive information source and generate a token from the sensitive information source; and (b) a provider system communicatively coupled to the tap device that receives the sensitive information and the token from the tap device and associates the sensitive information and the token together in a storage medium.

According to some embodiments, the present technology may be directed to tap devices for tokenizing sensitive information. The tap devices may include (a) a communications module that receives sensitive information from a credit card reader; (b) a tokenizing module that tokenizes sensitive information received from the credit card reader to produce a token; and (c) wherein the tap device is configured to reside inline between the credit card reader and a point of sale terminal, at a retail location.

BRIEF DESCRIPTION OF THE DRAWINGS

Certain embodiments of the present invention are illustrated by the accompanying figures. It will be understood that the figures are not necessarily to scale and that details (e.g., dimensions) not necessary for an understanding of the invention or that render other details difficult to perceive may be omitted. It will be understood that the invention is not necessarily limited to the particular embodiments illustrated herein.

DETAILED DESCRIPTION OF THE INVENTION

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Broadly speaking, devices, systems, and methods for tokenizing sensitive information are provided herein. While one of ordinary skill in the art will appreciate that the present technology may be applied to a wide variety of systems that receive, process, and store sensitive information, for the purposes of brevity, the following discussions will include a detailed description of the utilization of the present technology in the context of financial transactions.

The payment card industry, hereinafter "PCI," has established a set of compliance requirements that impose mandates on all entities that store, process, and/or transmit credit card data.

It will be understood that entities that receive or process credit card data must store cardholder data from each transaction for some period of time. Systems employed by entities for storing and/or transmitting credit card data may be susceptible to a wide variety of security breaches. For example, common security breaches may include credit card fraud, hacking, and numerous other security threats. Additionally, traditional methods for data protection, such as encryption, are often unsuitable to protect such highly sensitive information.

In response to these threats, PCI governing bodies require that entities must enact systems or processes that protect credit card data from intentional and/or unintentional exposure to third parties. Unfortunately, these commonly utilized systems and processes may require expensive hardware and software solutions, along with complex privacy policies that are difficult to understand and properly enforce. Many entities find it difficult to comply with the PCI requirements and seek ways to reduce both the risk and cost associated with meeting their PCI requirements, namely PCI data security standards.

To be sure, PCI data security standards require that entities eliminate any stored credit card data not required by the entity after any payment transaction. As such, the more an entity may reduce the places where credit card data is stored or otherwise retained, the more the entity may reduce the scope of their PCI compliance requirements.

To ensure that entities are compliant with PCI standards, entities must complete PCI compliance assessments and conduct additional ancillary tests, all of which impose significant financial obligations. Additionally, entities often spend significant time ensuring compliance with their annual PCI assessments. This problem is exacerbated when an organization maintains hundreds if not thousands of retail locations and performs thousands of transactions weekly.

The only way to ensure that entities are insulated or substantially relieved of their PCI requirements is to ensure that the credit card data utilized (e.g., stored, processed, transmitted) by these entities is minimized as much as practicably possible. By limiting PCI obligations, an entity may save tremendous amounts of time and money, and reduce risk in their environment.

One method for reducing stolen credit card information is in the use of tokenization. Tokenization is a technology wherein an electronic token is used to replace a credit card number (or other credit card data) in an electronic transaction.

The electronic token is a set of reference characters designed to prevent the theft of the credit card number during electronic transmission and or storage of the credit card data.

When properly utilized by an entity, tokenization may significantly reduce the scope and requirements of PCI compliance without costly changes to the systems of the entity. In some embodiments, a token may include a 16 digit, randomly generated character set resembling a credit card number. In other embodiments, the token may include a 15 digit character sets to accommodate various card brand characteristics. One of ordinary skill in the art will appreciate that many other types and sizes of tokens created from credit card data may likewise be utilized in accordance with the present disclosure.

According to some embodiments, tokenization procedures may produce tokens from credit card data that include only residual characters or numbers from the original primary account number, also known as a "PAN." The PAN may include the last four digits of a credit card, which may become the last four digits of the electronic token.

For credit card processing, tokenization complies with all PCI requirements, obligations, and standards. Tokenization may allow the entity to utilize unique tokens associated with individual or repeated credit card transactions. Therefore, the entity may completely eliminate the need to store credit card data in their environment (e.g., within a point of sale terminal, a database, or a web server).

While the above described use of tokens have contemplated their use in credit card transactions, tokens may also be used to store other customer information including banking account information, driver license numbers, social security card information, and image documents, among other sensitive information or combinations thereof.

The devices, systems, and methods described herein may be configured to tokenize sensitive information to reduce PCI obligations of entities that utilize the same. Tokenization systems provided herein may include input or tap devices that reside inline with credit card readers and point of sale terminals to intercept sensitive credit card data before the credit card data enters the point of sale terminal.

Entities that utilize tap devices inline with point of sale "POS" systems may not require hardware or software upgrades to their POS systems. As such, the POS terminal(s) of the entity are not considered to be "in scope" relative to PCI requirements. Ensuring that an entity's POS terminals are not "in scope" may significantly reduce or substantially eliminate risk and assessment costs associated with achieving and maintaining PCI compliance.

A reduction of operating costs associated with eliminating or substantially reducing the PCI compliance of an entity may also be seen in other internal company systems such as firewall and router configurations, software, detection systems, other point of sale system equipment, along with any other systems that an entity may utilize to process credit card data.

Additionally, entities may no longer require PCI approved scanning vendor, also known as "ASV," services or penetration testing, thus reducing or eliminating additional costs associated with the same.

While not all entities may eliminate all PCI compliance issues, even entities that are still subject to a measure of PCI compliance requirements may benefit from an expedited compliance engagement, yielding a reduced cost and risk to their environment.

Figure 1:
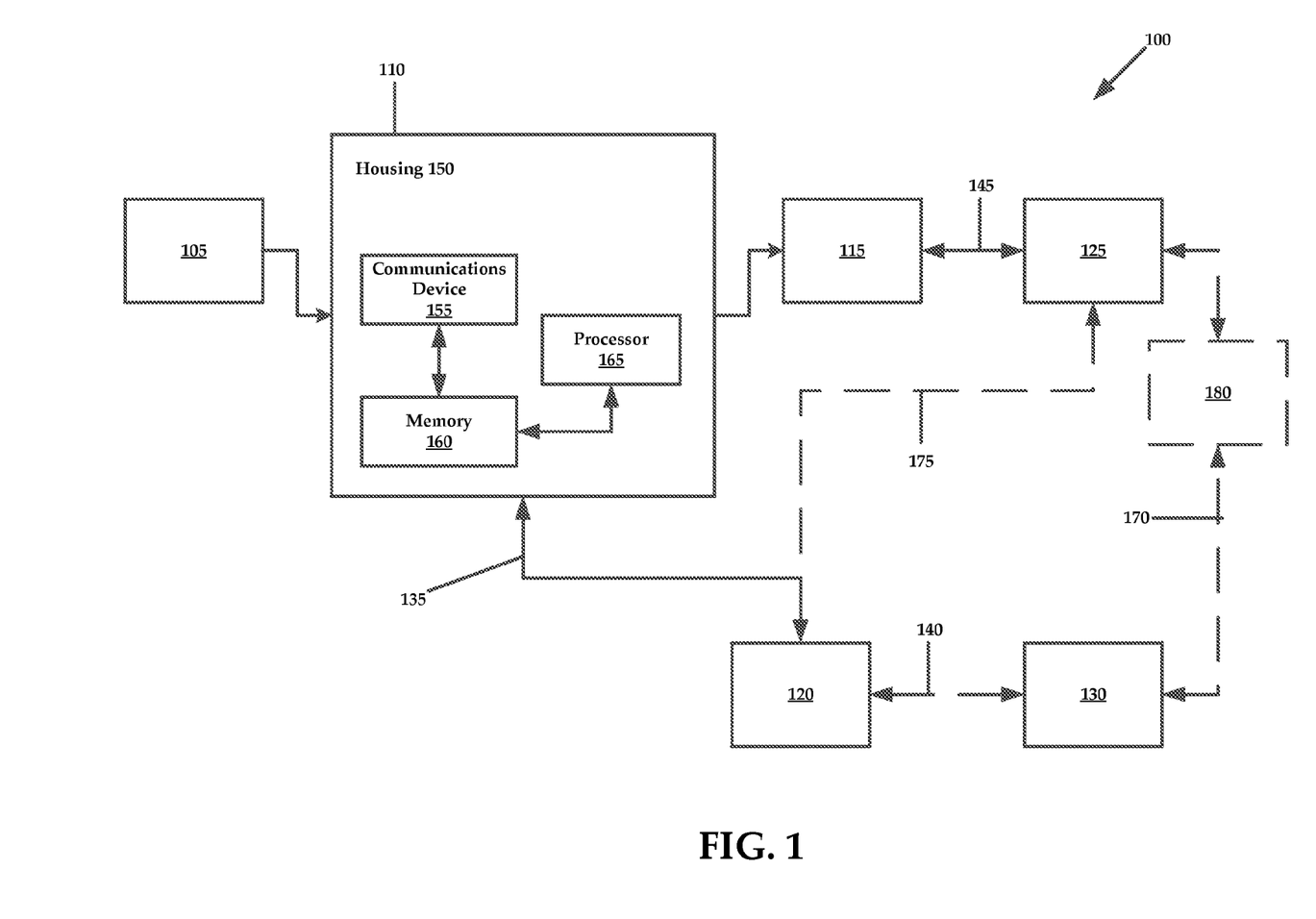
FIG. 1 illustrates an exemplary system for practicing aspects of the present technology.

Turning to the present technology in greater detail, FIG. 1 illustrates an exemplary system 100 for practicing aspects of the present technology. Generally speaking, the system 100 includes a sensitive information source, hereinafter "card reader 105," a tap device 110, a POS terminal 115, a provider system 120, a retail system 125, and a credit card authority 130 (also known as a "transaction processor").

The system 100 may be arranged such that the card reader 105, tap device 110, and POS terminal 115 reside at a first location such as a retail establishment or mobile point of sale system. The provider system 120 may reside at a second location that is remote from the first location. Additionally, the retail system 125 and the credit card authority 130 may reside at third and fourth locations, respectively.

It will be understood that the tap device 110 and the provider system 120 may be operated by the same entity, or may be operated by separate entities.

The tap device 110 and the provider system 120 may be communicatively coupled to one another via a first network 135. For security purposes, the tap device 110 and provider system 120 may communicate with one another over the first network 135 may utilize any of a number of end-to-end security protocols. Additionally, the provider system 120 may communicatively couple to the credit card authority 130 to facilitate the authorization of credit card transactions via a second network 140. Because the system 100 may utilize alternative device configurations to facilitate the authorization of credit card transactions, the second network 140 has been shown as a dotted line. Similarly to the first network 135, the second network 140 may be configured to utilize any one of a number of end-to-end security protocols.

Because the POS terminal 115 and retail system 125 may not receive credit card data, they may communicatively couple to one another via a third network 145 that may include a public or private communications network. It will be understood that because the POS terminal 115 and retail system 125 do not receive credit card data, they are considered to be "outside" of the scope of PCI requirements.

During the course of a retail transaction, credit card data may be provided to the card reader 105 by a consumer. The credit card data may be passed to the tap device 110. The tap device 110 generates a token from the credit card data and transmits the token along with the credit card data to the provider system 120. Additionally, the tap device 110 may provide the token to the POS terminal 115. The credit card data and token are associated with one another in a database of the provider system 120.

Exemplary Transaction Processing Utilizing a Token and Credit Card Data

In some embodiments, to complete a transaction, the POS terminal 115 may provide the token to the retail system 125 along with transaction information (e.g., transaction amount, SKU, etc.) that corresponds to the instant transaction. The retail system 125 may provide the token, along with the transaction information to the provider system 120. The communicative coupling of the retail system 125 and the provider system 120 is shown as dotted line 175.

To finalize the transaction, provider system 120 may provide the credit card data and the transaction data to the credit card authority 130. Once the credit card authority 130 has authorized the transaction, the credit card authority 130 provides payment verification or authorization to the retail system 125. The credit card authority 130 may also provide the token back to the retail system 125 for verification purposes. It will be understood that the terms "payment verification" may correspond to the phrase "transaction authorization information."

The retail system 125 may then provide the POS terminal 115 with the payment verification that enables the retail establishment to complete the transaction.

Additional Exemplary Transaction Processing Utilizing a Token and Credit Card Data In alternative embodiments, to complete a transaction, the POS terminal 115 may provide the token to the provider system 120 along with transaction information (e.g., transaction amount, SKU, etc.) that corresponds to the instant transaction. The provider system 120 may provide the token, along with the transaction information to the credit card authority 130.

Once the credit card authority 130 has authorized the transaction, the credit card authority 130 provides payment verification or authorization to the provider system 120. The provider system 120 may then send the POS terminal 115 the payment verification or authorization information. The terms "payment verification" may correspond to the phrase "transaction authorization information."

Additional Exemplary Transaction Processing Utilizing a Token and Credit Card Data In yet another exemplary embodiment, the system 100 may include a middleware device 180 disposed between the retail system 125 and the credit card authority 130. In this embodiment, the retail system 125 may receive a token and transaction information from the POS terminal 115. The provider system 120 may receive a token from the retail system 125 and the provider system may pass the credit card data associated with the token back to the retail system 125 or potentially the middleware device 180. In some applications, the middleware device 180 may facilitate credit card transactions between the credit card authority 130 and the retail system 125, exchanging data such as credit card data, transaction data, and payment authorization therebetween.

To be sure, the card reader 105, tap device 110, provider system 120, and credit card authority 130 are all subject to PCI compliance requirements. In contrast, the POS terminal 115 and retail system 125 are entirely outside the scope of PCI compliance requirements, thus minimizing and/or substantially eliminating the PCI requirements of the retail establishment.

Turning now to the components of the system 100, the card reader 105 may include any one of a number of different devices that are configured to receive credit card data from an individual. The card reader 105 may be configured to facilitate "card present" and/or "card not present" transactions. Card present transactions may occur when the consumer has their credit card physically present and available to the retailer, and where the consumer and the retailer are both together in the same physical location. Card not present transactions may occur when the consumer and the retailer are not together in the same location, such as the retail location. Card not present transactions frequently occur over the telephone or across the Internet.

With regard to card present transactions, an individual may swipe their credit card through a slot associated with the card reader 105. The slot typically includes one or more reading members that are configured to read credit card data stored in the magnetic stripe of a credit card. The magnetic stripe of the credit card stores pertinent credit card data such as track one, track two, and track three information. Track one (International Air Transport Association, "IATA") data may include data such as proprietary credit card authority data (e.g., card issuer data) along with discretionary data such as expiration date, service code, name, and so forth. Track two (American Bankers Association "ABA") data may include additional information compared to track one data. Additionally, track two data is stored in a different format from track one data. Track three data may include additional types of data such as demographic data related to height, age, eye color, and so forth.

One of ordinary skill in the art will appreciate that card reader 105 may include any number of devices or components for gathering credit card data from a credit card. For example, some credit cards store credit card data via smart card or radio frequency identification "RFID" technology that provide credit card data to an RFID credit card reader when the credit card is brought into close proximity with an RFID card reader. In some applications, the systems and methods provided herein may be configured to utilize Europay, MasterCard, and Visa standardized data, also referred to as "EMV" data.

The card reader 105 may include devices that are configured to facilitate "card not present" transactions where customers or retail employees may enter the credit card data of the customer via a keypad or keyboard. It is noteworthy that there are inherent security risks with regard to facilitating card not present transactions. As such, to reduce these risks, retailers and transaction processors that allow "card not present" transactions may require additional security data such as a card security code such as CVV, CVVC, CSC, or other types of credit card security data that would be known to one of ordinary skill in the art with the present disclosure before them.

Once swiped through the slot of the card reader 105, the reading member obtains the credit card data stored on the magnetic stripe of the credit card and translates that credit card data into a data format that is utilizable by the POS terminal 115.

Instead of providing credit card data to the POS terminal 115, the credit card data is provided to the tap device 110. According to some embodiments, the tap device 110 may include a housing 150 adapted to at least partially house a communications device (also known as a "communications module") 155, memory 160, and a processor 165. Tap device 110 may also include one or more of the components of computing system 500 as will be described in greater detail infra, with reference to FIG. 5.

The communications device 155 may be configured to facilitate communication of data between the card reader 105 and the tap device 110, namely the processor 165 of the card reader 105. In some embodiments, the communications device 155 may include a transceiver, a transmitter, a network adapter, and so forth.

It will be understood that in some embodiments, the card reader 105 and the tap device 110 may be linked together via a universal serial bus "USB" cable extending between the card reader 105 and the tap device 110. Therefore, the tap device 110 may include a USB adapter that receives an end of the USB cable. While the tap device 110 has been disclosed as utilizing a USB cable, one of ordinary skill in the art with the present disclosure before them will appreciate that many other types of connecting cables or linkages such as a serial cable, a firewire cable, and so forth, may likewise be utilized in accordance with the present technology.

According to additional embodiments, the processor 165 is configured to execute instructions that are stored in memory 160 to tokenize credit card data received from the card reader 105. Once the credit card data has been tokenized, the communications device 155 provides the credit card data and the token to the database of the provider system 120. It will be understood that rather than communicating the credit card data and the token to the database of the provider system 120, the credit card data and the token may be stored locally on the tap device 110 in a local memory store (not shown).

Figure 2:
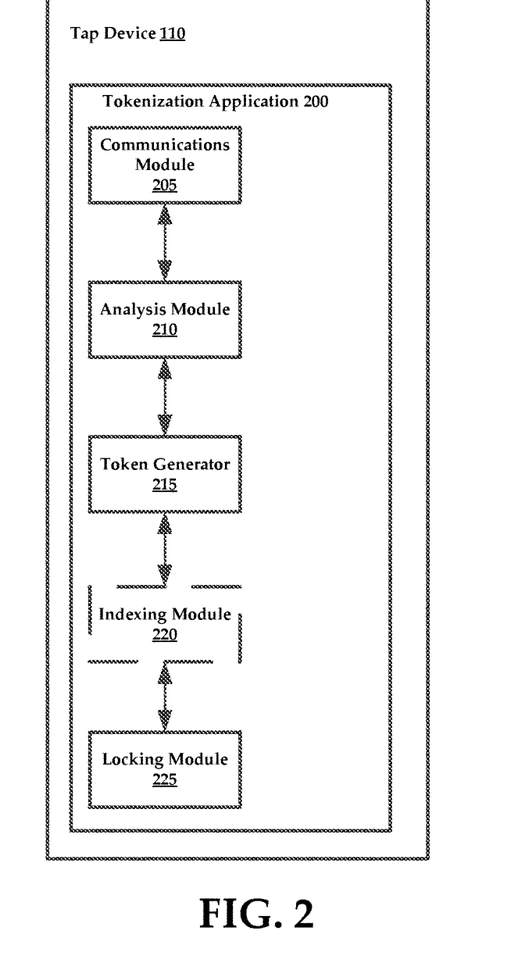
FIG. 2 illustrates a schematic diagram of a tokenizing application.

FIG. 2 illustrates a block diagram of a tokenization application 200 that resides within the memory 160 of the tap device 110 and that may be executed by the processor 165. The tokenization application 200 may include a communications module 205, an analysis module 210, and a token generator 215.

It is noteworthy that the tokenization application 200 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

In some embodiments, the communications module 205 may include USB host frame work, TCP/IP stack, and serial communication routines that facilitate all of the communications of the tap device 110. Generally speaking, the communications module 205 may receive credit card data from the card reader 105 and provide tokens to the provider system 120 and the POS terminal 115.

The analysis module 210 may receive credit card data from the communications module 205 and evaluate the credit card data to determine the PAN, card verification value "CVV," or "CVV2," card security code "CSC," card verification value code "CVVC," and any other associated information included in the data provided by the card reader 105.

Based upon the determined credit card data, the token generator 215 may apply one or more tokenization schemas to the credit card data to create a token. It will be understood that the tokenization schema may operate to create a token of any size and/or composition. For example, the token may include a plurality of numbers that include a portion of the PAN, or may include any permutation of numbers, letters, symbols, and so forth. It is noteworthy to mention that the token that is generated by the token generator 215 may have no mathematical or algorithmic relationship to the original credit card data. As such, the original credit card data may not be recreated from the token, even when the tokenization schema is known. In some applications, the token may be at least partially relatable to the original credit card data.

If the tap device 110 stores the token and the credit card data, the tokenization application 200 may include an indexing module 220 that is configured to associate tokens with the credit card data from which the token was created. Associating the token and credit card data together allow for further transaction processing. It will be understood that in some exemplary embodiments, the indexing module 220 may be associated with the provider system 120, such as when the provider system 120 is utilized to store tokens and associated credit card data.

Allowing the tap device 110 to store tokens and credit card data locally may reduce system latency. Additionally, storing tokens and credit card data on the tap device 110 removes the additional step of transmitting data across the first network 135, thus increasing the security of the system 100. In such embodiments, the tap device 110 may communicate bidirectionally with the credit card authority 130.

If the token and credit card data are to be stored remotely in the database of the provider system 120, the token and credit card data are provided to the provider system 120 by the communications module 205 of the tokenization application 200. Tokens may also be provided to the POS terminal 115 via the communications module 205.

According to some embodiments, the tap device 110 may include an additional locking module 225 that functions to render the tap device 110 inoperable upon the occurrence of a security breach. In some embodiments, the provider system 120 may monitor the operation of the tap device 110 to determine if a security breach of the tap device 110 has occurred. For example, the provider system 120 may determine unauthorized attempts to access to the tap device 110, or credit card data stored thereon.

Upon determining a security breach, the provider system 120 may communicate a locking signal to the locking module 225. Upon receiving the locking signal, the locking module 225 may erase or rewrite at least a portion of the data storage of the tap device 110. Additionally, the locking module 225 may cause any other damaging effect that renders the tap device inoperable and the data of the tap device 110 unrecoverable and/or unusable.

The locking module 225 may also be configured to determine if the tap device 110 has been unexpectedly disconnected from the card reader 105 or the POS terminal 115. Upon determining the occurrence of such an event, the locking module 225 may render the tap device 110 inoperable or unusable.

Figure 3:
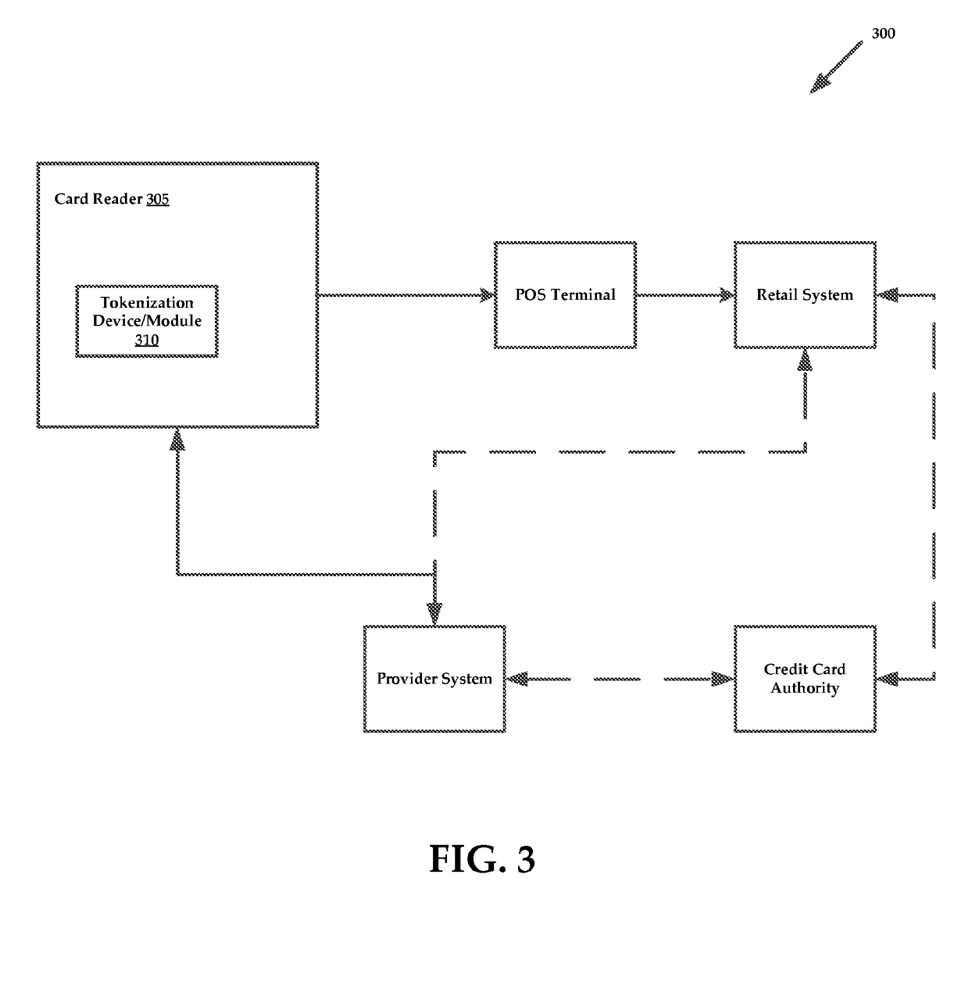
FIG. 3 illustrates an additional exemplary system for practicing aspects of the present technology.

FIG. 3 illustrates an additional exemplary embodiment of a system 300 for tokenizing sensitive information. The system 300 generally includes all of the components of system 100 (see FIG. 1) with the exception that the card reader 305 includes an integrated tokenization device 310. The combination of the card reader 305 and the integrated tokenization device 310 may be generally referred to as an "input device." For example, the card reader 305 may include a tokenization application (not shown) that functions similarly to the tokenization application 200 of FIG. 2, described in greater detail supra. Therefore, the tokenization of credit card data may occur within the card reader 305, itself.

Figure 4A:
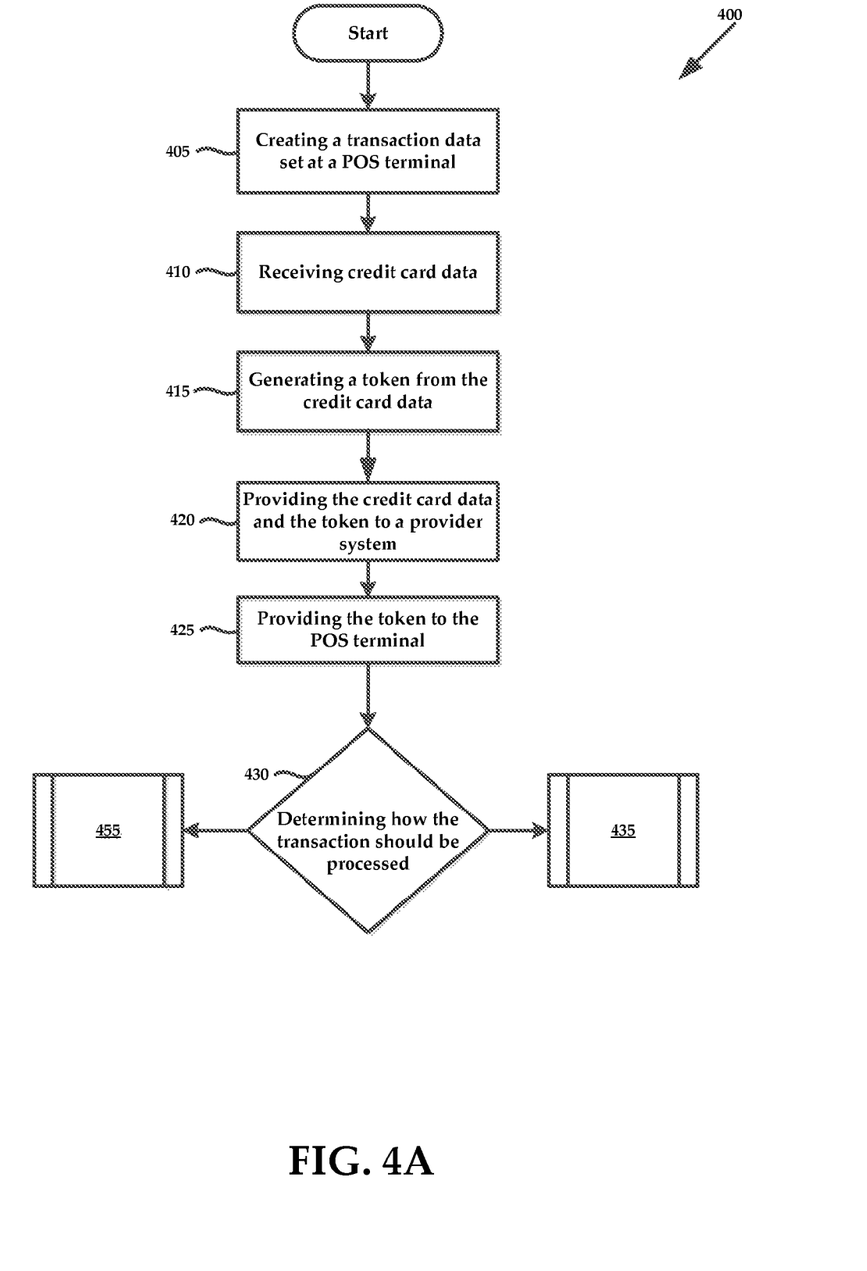
FIG. 4A illustrates a flow chart of an exemplary method of facilitating financial transactions utilizing tokens created from credit card data.

FIG. 4A illustrates a flow chart of an exemplary method 400 for facilitating financial transactions utilizing tokens created from credit card data. The method 400 may include the step 405 of creating a transaction data set at a POS terminal. The transaction data set may include information corresponding to a desired product and/or service and a payment amount that corresponds to the desired product and/or service. In response to generating a transaction data set, the method 400 includes the step 410 of receiving credit card data at the card reader. Step 410 may include swiping or entering credit card information at the card reader.

In step 415, the tap device receives the credit card data from the card reader and generates a token from the credit card data utilizing a tokenization schema. Next, the method includes the step 420 of providing the credit card data and the token to a provider system. The credit card data and the token may be indexed and stored together in the database of the provider system. The method 400 may also include step 430 of determining how the transaction should be processed. For example, step 430 may include determining if the credit card transaction should be processed via the retail system in step 435 (FIG. 4B) or the provider system in step 455 (FIG. 4C). It will be understood that the way in which the system 100 processes credit card transactions may be established in advance by the administrators of the retail system 125 and/or the provider system 120.

Figure 4B:
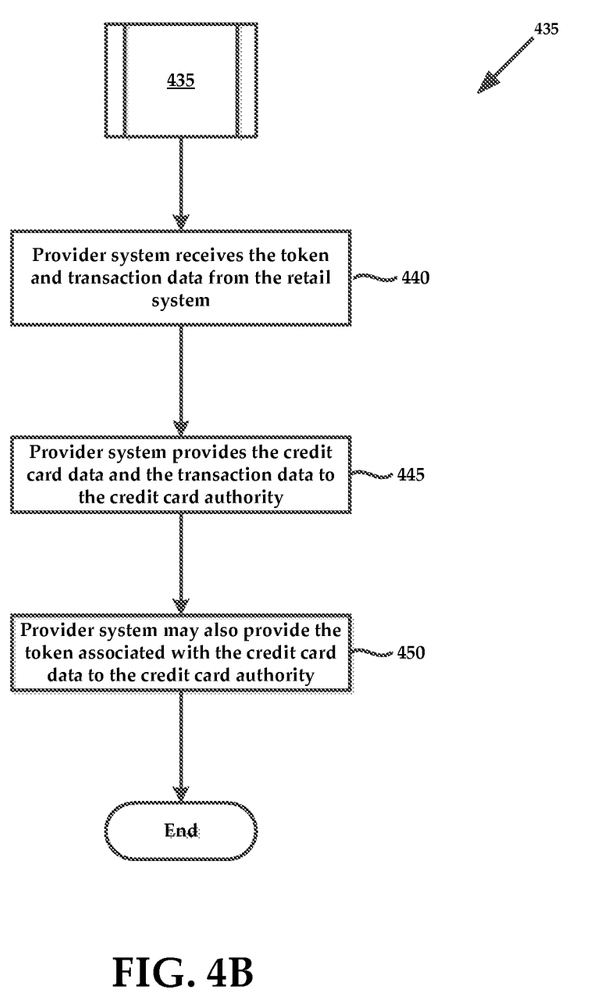
FIG. 4B illustrates a flow chart of an exemplary method of processing credit card transactions utilizing tokens created from credit card data.
Figure 4C:
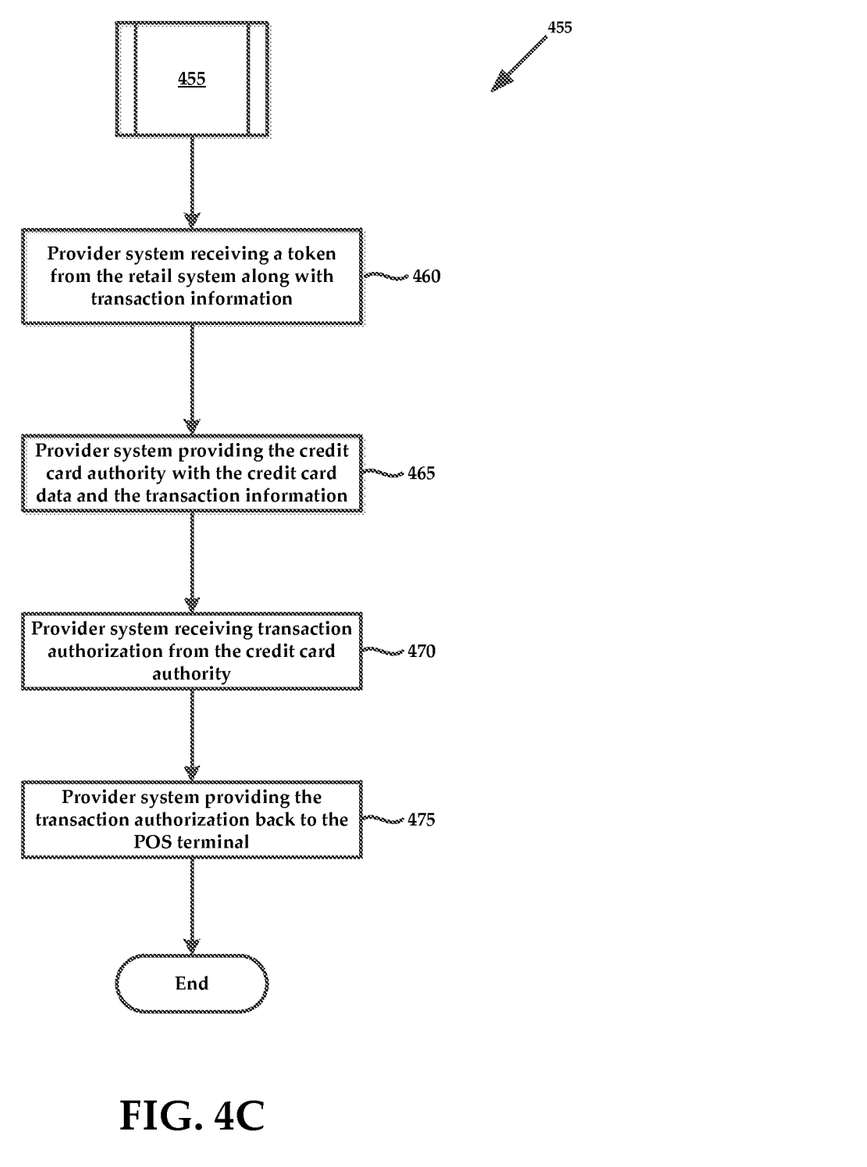
FIG. 4C illustrates a flow chart of another exemplary method of processing credit transactions utilizing tokens created from credit card data.

FIG. 4B illustrates a flow chart of an exemplary method 435 for processing credit card transactions utilizing a token and associated credit card data. The method may include the step 440 of the provider system receiving a token from the retail system (see 215 of FIG. 2). To be sure, the POS terminal provides the token and transaction information (e.g., transaction amount, SKU, etc.) to the retail system. The provider system then provides the transaction data and the credit card data to the credit card authority in step 445.

Next, the method may include the step 450 of the provider system providing the token to the credit card authority for verification purposes. Although not germane to the method, it is noteworthy that the credit card authority may alternatively receive the token and transaction information from a POS terminal or a retail system. Again, though not germane to the method, once the credit card authority has authorized the transaction, the credit card authority may pass the transaction authorization back to the retail system.

FIG. 4C illustrates a flow chart of an alternative exemplary method 455 for processing credit card transactions utilizing a token and associated credit card data. The method may include the step 460 of the provider system receiving a token from the retail system along with transaction information (e.g., transaction amount, SKU, etc.). Next, in step 465, the provider system then facilitates the transaction with the credit card authority by providing the credit card authority with the credit card data and the transaction information. Step 470 includes the provider system receiving transaction authorization from the credit card authority. Lastly, the method may include the provider system providing the transaction authorization back to the POS terminal in step 475. While method 455 contemplates the provider system executing the above-described steps, it will be understood that the tap device, or card reader/tap device may execute one or more of the above-described steps in place of the provider system, for example, when the tap device stores the token and the credit card data locally.

Additionally, the provider system may pass the token and the credit card data back to the credit card authority, allowing for the retail system and the credit card authority to communicate directly with one another to finalize a transaction.

Figure 5:
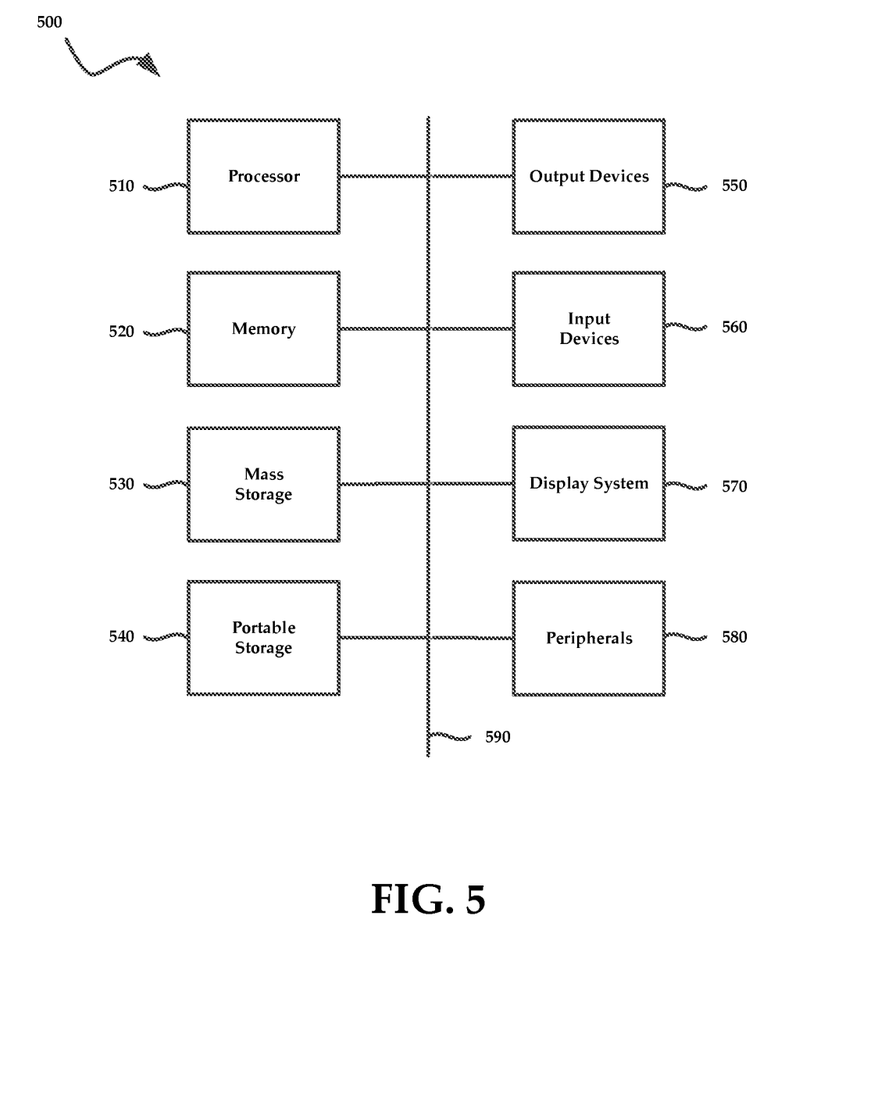
FIG. 5 is a block diagram of an exemplary computing system that may be utilized to practice aspects of the present disclosure.

FIG. 5 illustrates an exemplary computing system 500 that may be used to implement an embodiment of the present technology. The computing system 500 of FIG. 5 includes one or more processors 510 and memory 520. Main a memory store 520 stores, in part, instructions and data for execution by processor 510. Main a memory store 520 can store the executable code when the system 500 is in operation. The system 500 of FIG. 5 may further include a mass storage device 530, portable storage medium drive(s) 540, output devices 550, user input devices 560, a graphics display 540, and other peripheral devices 580.

The components shown in FIG. 5 are depicted as being connected via a single bus 590. The components may be connected through one or more data transport means. Processor 510 and main a memory store 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present technology for purposes of loading that software into main a memory store 520.

Portable storage device 540 operates in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for tokenizing sensitive data, comprising:
    receiving, by an input device, sensitive information on a first communication path the input device being positioned before a transaction terminal, the input device being coupled with the transaction terminal on a second communication path;
    generating, by the input device, a token from the received sensitive information;
    associating, by the input device, the generated token and the received sensitive information together in a storage medium within the input device;
    transmitting, by the input device, the generated token to the transaction terminal on the second communication path;
    determining, by the input device, that an indication from a transaction processor that the transmitted token was received;
    based on a determination, by the input device, that an indication from the transaction processor that the transmitted token was received, transmitting the received sensitive information used to generate the token, to the transaction processor;
    receiving, by the input device, from the transaction processor, transaction authorization information along with the at least one of the generated token and the transmitted sensitive information from which the token was generated; and
    transmitting, by the input device, at least one of the received transaction authorization information and the token to the transaction terminal.

2. The method according to claim 1, wherein associating includes transmitting the generated token and the received sensitive information to a storage device of a provider system over a communications channel that utilizes end-to-end encryption; and indexing the token and the sensitive information together.

3. The method according to claim 2, further comprising:
    monitoring the input device for a security breach; and
    determining, by the input device, that a security breach has occurred; and
    based on a determination that a security breach has occurred, rendering the input device inoperable.

4. The method according to claim 3, further comprising:
    determining, by the input device, that a locking signal is received from a provider system communicatively coupled to the input device; and
    based on a determination, by the input device, that a locking signal is received from a provider system communicatively coupled to the input device, executing a locking functionality of the input device.

5. A system for tokenizing sensitive information, comprising:
    an input device processor;
    instructions stored on a non-transitory medium, when executed by the input device processor, causes the input device processor to perform the steps of:
    receiving sensitive information on a first communication path;
    generating a token from the received sensitive information;
    associating the generated token and the received sensitive information together in a storage medium within the input device;
    transmitting the generated token to a transaction terminal on a second communication path, wherein the input device processor is positioned before the transaction terminal and linked via the second communication path;
    determining that an indication from a transaction processor that the transmitted token was received;
    based on a determination, by the input device, that an indication from the transaction processor that the transmitted token was received, transmitting the received sensitive information used to generate the token, to the transaction processor;
    receiving from the transaction processor, transaction authorization information along with the at least one of the generated token and the transmitted sensitive information from which the token was generated; and
    transmitting the received transaction authorization information and the token to the transaction terminal.

6. The system according to claim 5, wherein the storage medium is located remotely from the input device, and further wherein the tap device and a provider system are communicatively coupled together via a communications channel that utilizes an end-to-end encryption protocol.

7. The system according to claim 5, wherein the tap device is communicatively coupled to a sensitive information source that generates the sensitive information via at least one of a universal serial bus (USB) cable, a serial cable, a firewire cable, and combinations thereof.

8. The system according to claim 5,
further comprising the steps of:
determining that a locking signal is received from a provider system communicatively coupled to the input device; and
based on a determination that a locking signal is received from a provider system communicatively coupled to the input device, executing a locking functionality of the input device.

9. The system according to claim 5, wherein the tap device includes:
a housing;
a communications device communicatively coupling a processor to a sensitive information source, the communications device being associated with the housing;
a memory for storing executable instructions configured to tokenize sensitive information received from the sensitive information source;
wherein the processor is disposed within the housing to execute the instructions to tokenize sensitive information received from the sensitive information source, the processor being communicatively coupled to the communications device; and
wherein the communications device is communicatively coupled to a storage medium for that receives tokenized sensitive information and the sensitive information.

\* \* \* \* \*